United States Patent [19]
Hoffmann et al.

[11] Patent Number: 5,740,969
[45] Date of Patent: Apr. 21, 1998

[54] PIEZO-CONTROL VALVE FOR FUEL INJECTION SYSTEMS OF INTERNAL COMBUSTION ENGINES

[75] Inventors: Karl-Heinz Hoffmann, Stuttgart; Paul Schwerdt, Freudenstadt; Gerd Huber, München, all of Germany

[73] Assignee: Mercedes-Benz AG, Stuttgart, Germany

[21] Appl. No.: 728,342

[22] Filed: Oct. 9, 1996

[30] Foreign Application Priority Data

Oct. 18, 1995 [DE] Germany ............ 195 38 791.0

[51] Int. Cl.⁶ ........................................ F02M 61/04
[52] U.S. Cl. ............ 239/533.2; 239/584; 251/129.06
[58] Field of Search ................. 239/102.1, 102.2, 239/533.2, 584; 251/129.06

[56] References Cited

U.S. PATENT DOCUMENTS

| | | | |
|---|---|---|---|
| 4,284,263 | 8/1981 | Newcomb | 251/129.06 |
| 4,720,077 | 1/1988 | Minoura et al. | 239/102.2 X |
| 4,725,002 | 2/1988 | Trachte | 239/533.2 X |
| 5,094,430 | 3/1992 | Shirai et al. | 251/129.06 |
| 5,224,510 | 7/1993 | Pericles | 251/129.06 X |

FOREIGN PATENT DOCUMENTS

| | | |
|---|---|---|
| 29 31 874 | 8/1983 | Germany . |
| 85/02445 | 6/1985 | WIPO . |

OTHER PUBLICATIONS

Martin Romphorst, "Ein Neues Elektronisches Hochdruck-Einspritzsystem für Dieselmotoren", *MTZ Motortechnische Zeitschrift*, 1995, pp. 142–148.

*Primary Examiner*—Lesley D. Morris
*Attorney, Agent, or Firm*—Klaus J. Bach

[57] ABSTRACT

In a piezo-control valve for fuel injection systems of internal combustion engines wherein a piezo-ceramic actuating rod is mounted with one end firmly to one end of a valve housing having a nozzle body with a valve seat disposed at the other end and a nozzle control needle is disposed in the nozzle body and pressed by the piezo-ceramic actuating rod onto the valve seat in the nozzle body when the piezo-ceramic actuating rod is not activated, the valve housing includes a sleeve-like portion disposed around the piezo-ceramic actuating rod which consists of a material compensating for temperature-caused changes in the length of the piezo-ceramic actuating rod.

6 Claims, 1 Drawing Sheet

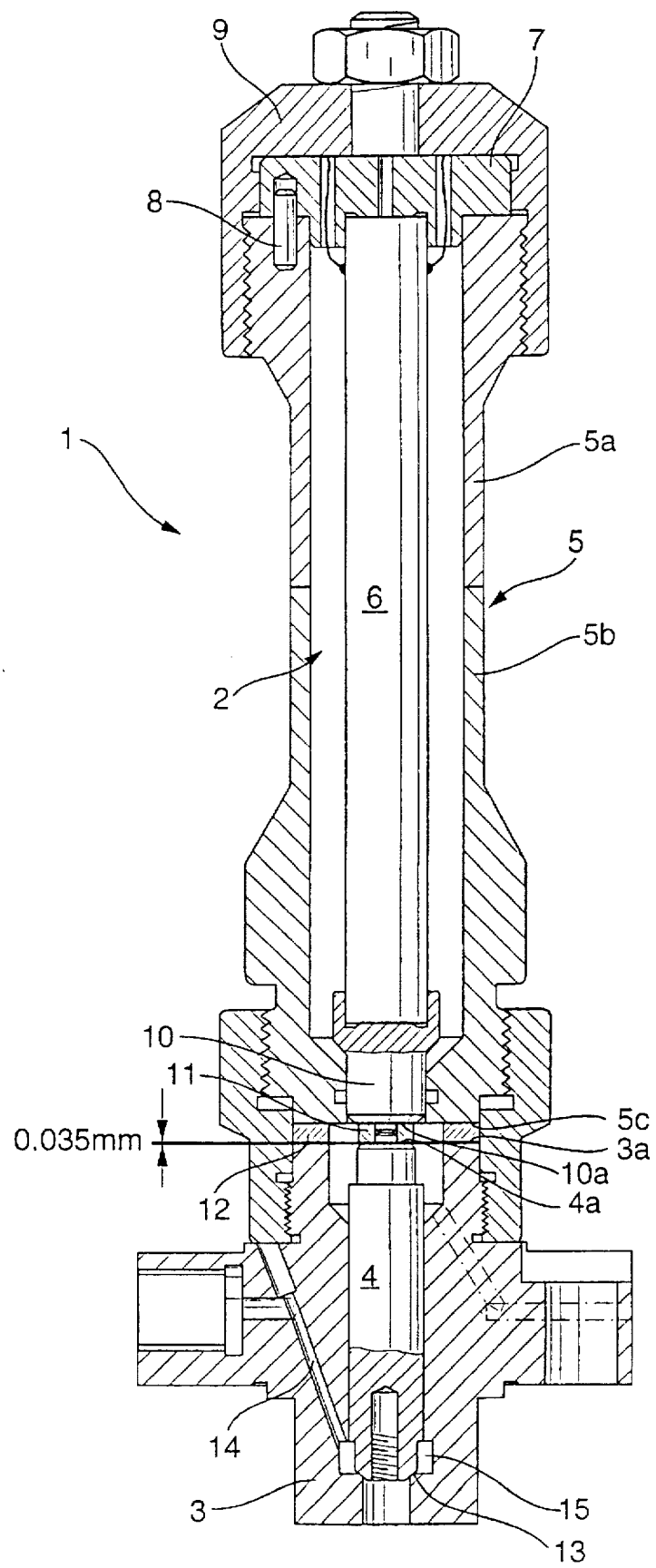

5,740,969

PIEZO-CONTROL VALVE FOR FUEL INJECTION SYSTEMS OF INTERNAL COMBUSTION ENGINES

BACKGROUND OF THE INVENTION

The invention relates to a piezo-control valve having an end nozzle for fuel injection systems of internal combustion engines and a piezo-ceramic structure which is supported in a valve housing and has a needle-like closing portion seated on a valve seat and cooperating with a piezo actuation rod firmly mounted in the valve housing end remote from the end nozzle such that the needle-like closing portion is lifted off the valve seat when the piezo actuation rod is activated.

A magnetostrictive or piezo-ceramic fuel injection valve with a closing member disposed on a valve seat is known for example from DE 29 31 874 C2. The valve includes a magnetostrictive rod which has a valve closing end and which, at the opposite end, is connected to a support structure capable of moving axially and dampening axial movements so that the rod is somehow floatingly supported whereby different heat expansion of the valve housing and the arrangement controlling the valve lift can be accommodated.

However, with this arrangement, the valve lift may vary somewhat depending on the temperature so that a particular control signal does not always generate the same valve lift.

It is the object of the present invention to provide a simple and space-saving piezo-control valve of the type referred to above wherein the valve lift which corresponds to the engine requirements is always the same independently of temperature changes.

SUMMARY OF THE INVENTION

In a piezo-control valve for fuel injection systems of internal combustion engines wherein a piezo-ceramic actuating rod is mounted with one end firmly to one end of a valve housing having a nozzle body with a valve seat disposed at the other end and a nozzle control needle is disposed in the nozzle body and pressed by the piezo-ceramic actuating rod onto the valve seat in the nozzle body when the piezo-ceramic actuating rod is not activated, the valve housing includes a sleeve-like portion disposed around the piezo-ceramic actuating rod which consists of a material compensating for temperature-caused changes in the length of the piezo-ceramic actuating rod.

With the arrangement according to the invention the valve housing is expanding essentially at the same rate as the rod-like piezo-ceramic actuating rod whereby, in addition to achieving the high control speed required for today's internal combustion engines, the injection pattern can be controlled in an accurate manner particularly with extremely high pressure systems such as common rail fuel injection systems.

An embodiment of the invention will be described below on the basis of the accompanying drawing.

BRIEF DESCRIPTION OF THE DRAWING

The sole FIGURE is a cross-sectional view of a fuel injection valve according to the invention.

DESCRIPTION OF THE PREFERRED EMBODIMENT

A piezo-control valve 1 for a fuel injection system such as a Diesel engine injection system comprises essentially an elongated valve housing 5, a piezo ceramic device 2 disposed in the valve housing 5 and a nozzle body 3 with a nozzle control needle 4 axially movably disposed in the nozzle body 3. The valve housing 5 is a sleeve-like member preferably consisting of two coaxial sleeve parts 5a, 5b which consist of materials with different heat expansion coefficients.

The piezo-ceramic device 2 includes a rod-like piezo actuator 6 whose one end is disposed adjacent the nozzle control needle 4 and whose opposite end is firmly mounted on a disc-like end piece 7 which is supported at the adjacent end of the sleeve part 5a and fixed by a pin 8 so as to be non-rotatable with respect to the sleeve part 5a. The disc-like end piece 7 is firmly mounted onto the free end of the sleeve part 5a by means of a cup nut 9.

At its end adjacent the control needle 4, the piezo-actuator 6 which contracts when activated is firmly connected to an intermediate member 10. The front face 10a of this intermediate member 10 and the end face 5c of the housing sleeve part 5b are ground so as to be flush with respect to each other. The end face 4a of the nozzle control needle 4 and the front end 3a of the nozzle body 3 adjacent the intermediate member front face 10a are also ground flush.

In order to prevent fuel leakage along the valve seat 13 when the piezo actuator 6 is seated on the nozzle control needle 4 via the intermediate member 10 the nozzle control needle 4 must be engaged with the valve seat 13 with a force which is higher than the lifting force generated by the fuel pressure. This is achieved by threading the component assembly 5, 7, 9, 6, 10 onto the nozzle body 3 such that the front face 10a of the intermediate member 10 firmly presses the control needle 4 onto the valve seat 13 by way of an intermediate disc 11. The sleeve part 5b and the nozzle body 3 are in engagement with one another by way of an intermediate washer 12 which is thinner than the intermediate disc 11 by a system-specific accurate amount which in the present case is 0.035 mm. This amount causes an elastic compression of the piezo actuator which generates the required seating force for the control needle 4.

The reference numeral 14 designates a fuel supply passage which leads to a pressure space 15 formed between the nozzle control needle 4 and the nozzle body 3. The two part valve housing sleeve 5 consists of different materials. Specifically, the lower sleeve part 5b consists of normal steel whereas the upper sleeve part 5a consists of Invar.

In order to achieve essentially the same temperature expansion for the piezoactuator 6 at one hand and the two-part valve housing sleeve on the other, the axial lengths of the sleeve part 5b of steel and the sleeve part 5a of Invar are so selected that the sum of the heat expansion of the sleeve parts 5a and 5b corresponds to the heat expansion of the piezo actuator 6, that is, the heat expansion of the sleeve parts 5a and 5b compensates for the heat expansion of the rod-like piezo actuator 6.

Instead of the two part valve housing sleeve, a single part valve housing sleeve can be utilized which consists of a material having a heat expansion coefficient corresponding to that of the piezo actuator rod 6.

What is claimed is:

1. A piezo control valve for fuel injection systems of internal combustion engines comprising:

a valve housing including a piezo-ceramic actuating rod having one end firmly mounted to one end of said valve housing, a nozzle body with a valve seat disposed at the other end of said valve housing, and a nozzle control needle which is disposed at the opposite end of said piezo-ceramic actuating rod and is normally seated on said valve seat and which, upon activation of said piezo-ceramic actuating rod, is lifted, by contraction of said piezo-ceramic actuating rod, from said valve seat to open said control valve, said valve housing surrounding said piezo-ceramic actuating rod including a sleeve-like portion consisting of a material compensating for any temperature-caused changes in length of the piezo-ceramic actuating rod.

2. A piezo control valve according to claim 1, wherein said sleeve-like valve housing portion comprises two sleeve parts axially attached to one another and consisting of different materials with different temperature expansion coefficients.

3. A piezo control valve according to claim 1, wherein, between said nozzle control needle and said piezo-ceramic actuating rod, an intermediate member is disposed and is attached to said piezo-ceramic actuating rod, said intermediate member having a front face which is flush with an adjacent end face of said sleeve-like valve housing portion.

4. A piezo control valve according to claim 3, wherein said valve seat is arranged in a nozzle body at the other end of said valve housing and a pressure space extends around said control needle in said nozzle body, said nozzle body including a fuel supply passage leading to said pressure space, and the rear end of said control needle opposite said valve seat being flush with said nozzle body when said control needle is seated on said valve seat.

5. A piezo control valve according to claim 4, wherein an intermediate disc of a given thickness is disposed between said rear end of said control needle and said intermediate member mounted to the end of said piezo-ceramic actuating rod and a washer of a given thickness is disposed between the sleeve portion and said nozzle body concentrically around said intermediate disc, wherein the thickness of said intermediate disc is slightly greater than the thickness of said washer so as to provide for resilient compression of said actuating rod when said nozzle body is mounted onto said sleeve-like housing portion.

6. A piezo control valve according to claim 1, wherein said valve housing includes two sleeve parts extending around said actuating rod, one of said sleeve parts adjacent said nozzle body consisting of steel and the other of Invar, the lengths of said two sleeve parts being so selected that their combined thermal expansion rate is essentially the same as that of said actuating rod so that the travel distance of said control needle is independent of temperature variations.

* * * * *